(12) United States Patent
Oh et al.

(10) Patent No.: US 12,525,690 B2
(45) Date of Patent: Jan. 13, 2026

(54) MULTI-LAYER CERAMIC BATTERY AND METHOD FOR MANUFACTURING THE SAME

(71) Applicant: SAMHWA CAPACITOR CO., LTD., Yongin-si (KR)

(72) Inventors: Young Joo Oh, Yongin-si (KR); Jung Rag Yoon, Yongin-si (KR); Jong Kyu Lee, Yongin-si (KR)

(73) Assignee: SAMHWA CAPACITOR CO., LTD., Yongin-si (KR)

( * ) Notice: Subject to any disclaimer, the term of this patent is extended or adjusted under 35 U.S.C. 154(b) by 745 days.

(21) Appl. No.: 17/972,758

(22) Filed: Oct. 25, 2022

(65) Prior Publication Data

US 2023/0369730 A1 Nov. 16, 2023

(30) Foreign Application Priority Data

May 16, 2022 (KR) .......................... 10-2022-0059683

(51) Int. Cl.
| | |
|---|---|
| *H01M 50/562* | (2021.01) |
| *H01M 4/505* | (2010.01) |
| *H01M 4/525* | (2010.01) |
| *H01M 10/0562* | (2010.01) |
| *H01M 50/128* | (2021.01) |
| *H01M 50/564* | (2021.01) |

(52) U.S. Cl.
CPC ......... *H01M 50/562* (2021.01); *H01M 4/505* (2013.01); *H01M 4/525* (2013.01); *H01M 10/0562* (2013.01); *H01M 50/128* (2021.01); *H01M 50/564* (2021.01)

(58) Field of Classification Search
CPC ............ H01M 50/562; H01M 50/128; H01M 50/564; H01M 4/505; H01M 4/525; H01M 10/0562
See application file for complete search history.

(56) References Cited

U.S. PATENT DOCUMENTS

| | | | |
|---|---|---|---|
| 2013/0273437 A1 | 10/2013 | Yoshioka et al. | |
| 2020/0274194 A1* | 8/2020 | Takahata | ............... H01M 4/131 |
| 2021/0036362 A1* | 2/2021 | Ueno | ................. H01M 10/0525 |
| 2021/0384450 A1* | 12/2021 | Shin | ..................... C07F 15/0086 |

FOREIGN PATENT DOCUMENTS

KR 101338094 12/2013

* cited by examiner

*Primary Examiner* — Jane J Rhee
(74) *Attorney, Agent, or Firm* — CANTOR COLBURN LLP

(57) ABSTRACT

Provided are a multi-layer ceramic battery and a method thereof. The method includes: forming a pair of conductive terminal layers to partly cover one side and the other side of a battery body; forming an outer insulating coating layer to cover the surface of the battery body and each surface of the pair of conductive terminal layers; forming a pair of insulating coating windows by polishing the outer insulating coating layer to expose the surfaces of the conductive terminal layers formed at the ends of the one side and the other side of the battery body; forming a pair of inner plating layers to connect to the surfaces of the conductive terminal layers exposed through the insulating coating windows and partly cover one side and the other side of the outer insulating coating layer; and forming a pair of outer plating layers to cover the inner plating layers.

11 Claims, 4 Drawing Sheets

MULTI-LAYER CERAMIC BATTERY AND METHOD FOR MANUFACTURING THE SAME

BACKGROUND OF THE INVENTION

1. Technical Field

The present invent ion relates to a multi-layer ceramic battery (MLCB) and a method for manufacturing the same, and more particularly, to a multi-layer ceramic battery (MLCB) and a method for manufacturing the same, where external electrodes for a battery body are prepared by sequentially forming conductive terminals for external electrode and an insulating coating layer on the outer side of the battery body and then plating the conductive terminals for external electrode, thereby making the conductive terminals for external electrode firmly adhere to the insulating coating layer to improve moisture resistance.

2. Description of the Related Art

A laminated solid-state secondary battery is formed by sequentially stacking a plurality of secondary unit battery cells. Each of the secondary unit battery cells is formed by sequentially disposing an anode material layer, an electrolyte layer and a cathode material layer. Such a laminated solid-state secondary battery uses a solid-state electrolyte layer as an electrolyte layer that allows electron conduction of lithium ions. The technology related to a laminated solid-state secondary battery using a solid-state electrolyte layer as an electrolyte layer is disclosed in Korean Patent Publication No. 10-1338094 (Patent Document 1).

Patent Document 1 relates to a separator to keep the cells apart and a laminated solid-state secondary battery with the separator. The laminated solid-state secondary battery includes a plurality of unit cells and a separator that keeps the cells apart.

Each of the unit cells consists of an anode layer, a solid-state electrolyte layer and a cathode layer, which layers are sequentially laminated, and a separator disposed between the unit cells to keep the cells apart. The separator has an insulating portion and a conductive portion. The insulating portion insulates the plurality of unit cells from each other against electrical or ionic conduction. The conductive portion is formed in the insulating portion to make the plurality of unit cells electrically connect to each other. The insulating portion and the conductive portion are formed through a co-sintering process.

A conventional laminated solid-state secondary battery as disclosed in Patent Document 1 is constructed by sequentially forming external electrodes and an insulating coating layer, as a result of which a space is created between the external electrodes and the insulating coating layer with aging, allowing penetration of moisture or the like from the external environment into the interior through the space to cause and causing deterioration of the moisture resistance.

PRIOR DOCUMENTS

Patent Documents (Patent Document 1): Korean Patent Publication No. 10-1338094

SUMMARY OF THE INVENTION

For solving the aforementioned problems, it is an object of the present invention to provide a multi-layer ceramic battery (MLCB) and a method for manufacturing the same, where the MLCB has external electrodes for a battery body that are prepared by sequentially forming conductive terminals for external electrode and an insulating coating layer on the outer side of the battery body and then plating the conductive terminals for external electrode, thereby making the conductive terminals for external electrode firmly adhere to the insulating coating layer to improve moisture resistance.

It is another object of the present invention to provide a multi-layer ceramic battery (MLCB) and a method for manufacturing the same, where the MLCB has external electrodes for a battery body that are prepared by sequentially forming conductive terminals for external electrode and an insulating coating layer and then plating the conductive terminals for external electrode, so that the conductive terminals for external electrode can firmly adhere to the insulating coating layer to improve moisture resistance, thereby preventing moisture or foreign substances from penetrating into the battery body during the process of plating the conductive terminals for external electrode.

It is further another object of the present invention to provide a multi-layer ceramic battery (MLCB) and a method for manufacturing the same, where the MLCB provides a firm adhesion between conductive terminals for external electrode and an insulating coating layer to improve heat & moisture resistance, thereby enhancing the electrical reliability of the product.

It is still further another object of the present invention to provide a multi-layer ceramic battery (MLCB) and a method for manufacturing the same, where the insulating coating layer is made of at least one selected from silanes, oxides, and glass to further improve moisture resistance.

In order to achieve the object of the present invention, there is provided a method for manufacturing a multi-layer ceramic battery (MLCB) that includes: forming a pair of conductive terminal layers to partly cover one side and the other side of a battery body, respectively; forming an outer insulating coating layer to cover the surface of the battery body and each surface of the pair of conductive terminal layers; forming a pair of insulating coating windows by polishing the outer insulating coating layer to expose the surfaces of the conductive terminal layers formed at the ends of the one side and the other side of the battery body; forming a pair of inner plating layers to connect to the surfaces of the conductive terminal layers exposed through the insulating coating windows and partly cover one side and the other side of the outer insulating coating layer, respectively; and forming a pair of outer plating layers to cover the inner plating layers, respectively.

BRIEF DESCRIPTION OF DRAWINGS

The above and/or other aspects of the present invention will become apparent and more readily appreciated from the following description of the exemplary embodiments, taken in conjunction with the accompanying drawings in which.

DESCRIPTION OF SYMBOLS

Figure 1:
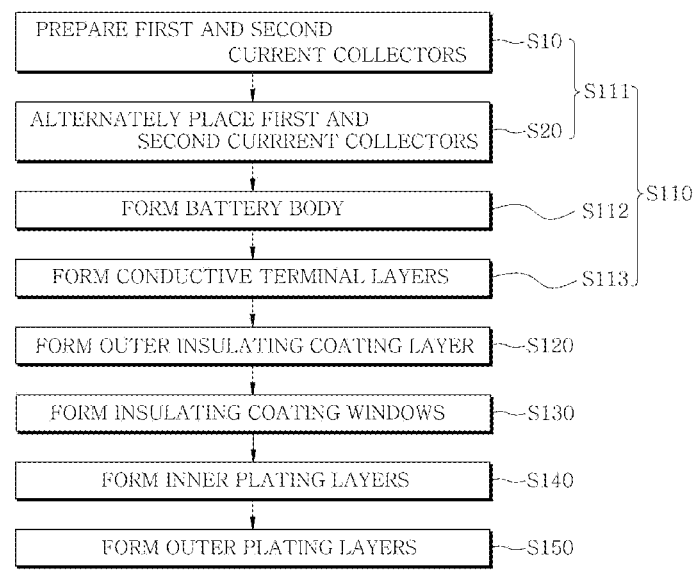
FIG. 1 is a flow chart showing a method for manufacturing a multi-layer ceramic battery (MLCB) according to the present invention.

100: Battery body
110: Unit battery cell
111: First current collector
112: Second current collector
113: Anode material layer
114: Cathode material layer
115: Solid-state electrolyte layer
120: Unit cell insulating layer
130: Insulating member
200, 300: External electrodes
210, 310: Conductive terminal layers
220, 320: Inner plating layers
230, 330: Outer plating layers
400: Outer insulating coating layer
410: Silane-based insulating coating layer
420: Oxide-based insulating coating layer
430: Glass insulating coating layer

DETAILED DESCRIPTION

Hereinafter, a description will be given as to embodiments of a multi-layer ceramic battery (MLCB) and a method for manufacturing the same according to the present invention with reference to the accompanying drawings.

Figure 2:
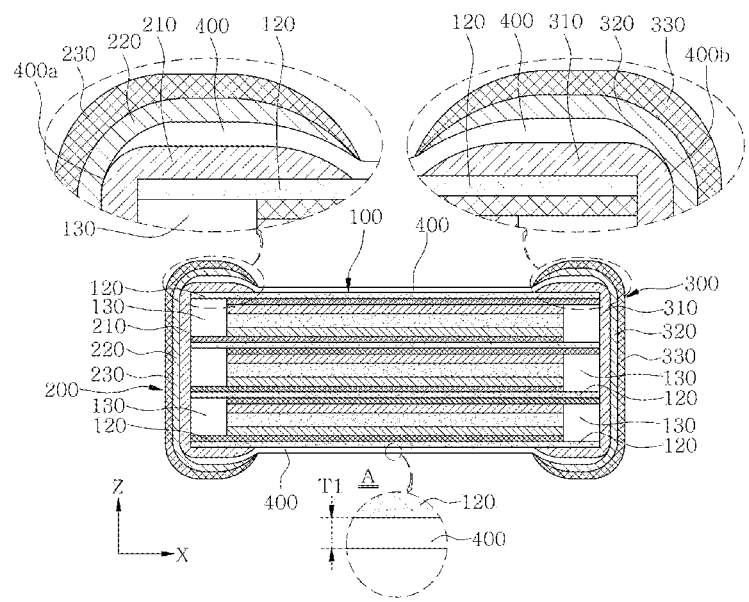
FIG. 2 is a cross-sectional view of an MLCB prepared by the manufacturing method for MLCB as shown in FIG. 1.

Referring to FIGS. 1 and 2, the method for manufacturing a multi-layer ceramic battery (MLCB) according to the present invention includes forming a pair of conductive terminal layers 210 and 310 to partly cover one side and the other side of a battery body 100, respectively, in step S110. After the pair of conductive terminal layers 210 and 310 are formed, an outer insulating coating layer 400 is formed to cover the surface of the battery body 100 and the surfaces of the pair of conductive terminal layers 210 and 310, in step S120. After the outer insulating coating layer 400 is formed, a pair of insulating coating windows 400a and 400b are formed by polishing the outer insulating coating layer 400 to expose the surfaces of the conductive terminal layers 210 and 310 formed at the ends of the one side and the other side of the battery body 100, respectively, in step S130. After the pair of insulating coating windows 400a and 400b are formed, a pair of inner plating layers 220 and 320 are formed to connect to the surfaces of the conductive terminal layers 210 and 310 exposed through the insulating coating windows 400a and 400b and partly cover one side and the other side of the outer insulating coating layer 400, respectively, in step S140. After the pair of inner plating layers 220 and 320 are formed, a pair of outer plating layers 230 and 330 are formed to cover the inner plating layers 220 and 320, respectively, in step S150.

An embodiment of the method for manufacturing a multi-layer ceramic battery (MLCB) according to the present invention can be described as follows.

Figure 7:
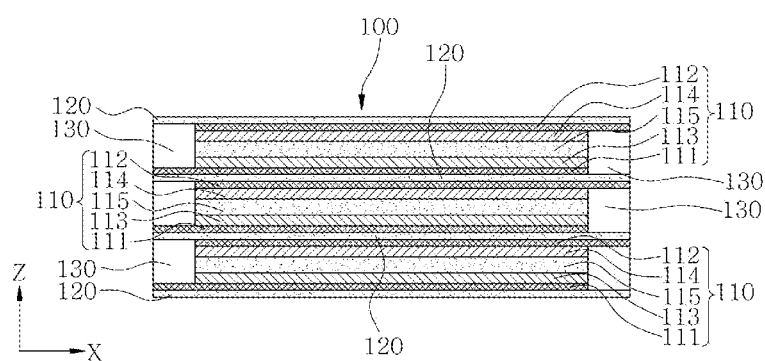
FIG. 7 is an enlarged cross-sectional view of the battery body shown in FIG. 2.

As shown in FIGS. 1 and 7, the method for manufacturing an MLCB according to the present invention includes forming a pair of conductive terminal layers 210 and 310 to partly cover one side and the other side of a battery body 100, respectively, in step S110.

Figure 5:
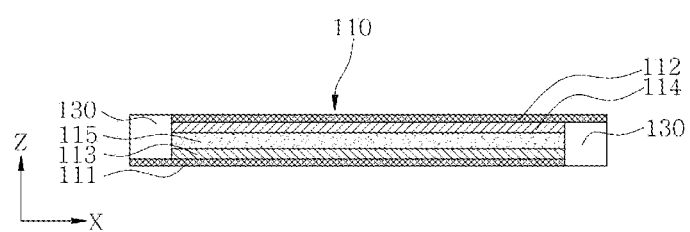
FIG. 5 is an enlarged view of the unit battery cell shown in FIG. 2.

In the step S110 of forming a pair of conductive terminal layers 210 and 310 to partly cover one side and the other side of a battery body 100, respectively, a plurality of unit battery cells 110 and a plurality of unit cell insulating layers 120 are prepared for the battery body 100, as shown in FIGS. 1 and 5, in step S111. In preparation of unit battery cell 110, first and second current collectors 111 and 112 are prepared in step S10, where an anode material layer 113 is formed on the other side of the first current collector 111, and the end of the one side of the first current collector 111 is connected to one of the pair of conductive terminal layers 210 and 310; and a cathode material layer 114 is formed on one side of the second current collector 112, and the end of the other side of the second current collector 112 is connected to the other one of the pair of conductive terminal layers 210 and 310. After the first and second current collectors 111 and 112 are prepared, a solid-state electrolyte layer 115 is disposed between the anode material layer 113 and the cathode material layer 114 so that the second current collector 112 is alternately placed on the top or bottom side of the first current collector 111, in step S20. Here, the top or bottom side is referred to as being along the height direction Z of the first current collector 111, the second current collector 112 or the battery body 100, and one side or the other side is referred to as being along the lengthwise direction X of the first current collector 111, the second current collector 112 or the battery body 100.

Figure 6:
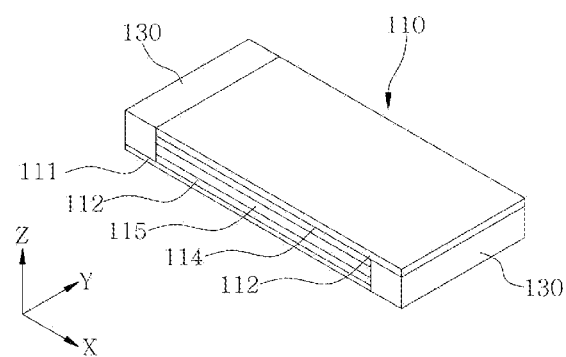
FIG. 6 is a perspective view of the unit battery cell shown in FIG. 5.

In the step of alternately placing the second current collector 112 on the top or bottom side of the first current collector 111, where the first and second current collectors 111 and 112 are arranged alternately with each other, an inner insulating member 130 is formed to position on one side or the other side of the anode material layer 113, the solid-state electrolyte layer 115 and the cathode material layer 114, and on the top of the other side of the first current collector 111 on the bottom of the one side of the second current collector 112, respectively. In this manner, as shown in FIGS. 5 and 6, the first and second current collectors 111 and 112 are arranged alternately with each other while the anode material layer 113, the solid-state electrolyte layer 115 and the cathode material layer 114 are sequentially laminated.

As the first current collector 111 or the second current collector 112 is laminated to protrude on one side or the other side, there occurs a space between the end of one side or the other side of the anode material layer 113, the solid-state electrolyte layer 115 or the cathode material layer 114 and the first or second current collector 111 or 112. This space is filled with the inner insulating member 130, which can eventually improve the flatness of the unit battery cell 110 as the first and second current collectors 111 and 112 are arranged alternately with each other and compressed. With this, the battery body 100 can be made flat even though it is manufactured with a plurality of unit battery cells 110 through lamination, followed by compression and thermal treatment. The first and second current collectors 111 and 112, the anode material layer 113, the cathode material layer 114, and the solid-state electrolyte layer may be prepared by a method of spraying, sputtering, printing, etc., and the plurality of unit battery cells 110 or the battery body 100 may be prepared using known methods of lamination, compression, and thermal treatment, a description of which methods is not given in this disclosure.

The anode material layer 113 formed on the top surface of the first current collector 111 or the second current collector 112 is formed of lithium cobalt oxide (LCO) or lithium manganese oxide (LMO), and the cathode material layer 114 is formed of lithium titanium oxide (LTO) or carbon. The material of the solid-state electrolyte layer 115 disposed between the anode material layer 113 and the cathode material layer 114 is any one of LGPS ($Li_{10}GeP_2S_{12}$), LSPSCl ($Li_{9.54}Si_{1.74}P_{1.44}S_{11.7}Cl_{10.3}$) and LLTO ($Li_{0.5}La_{0.5}TiO_3$). The unit cell insulating layers 120 and the inner insulating member 130 are independently formed of at least one of $Al_2O_3$, ZrO, and glass, which may be used alone or in combination with each other.

After the plurality of unit cell insulating layers 120 are prepared, as shown in FIGS. 1 and 7, they are disposed on the top or bottom side of the plurality of unit battery cells 110, respectively, to form the battery body 100, in step S112.

Figure 8:
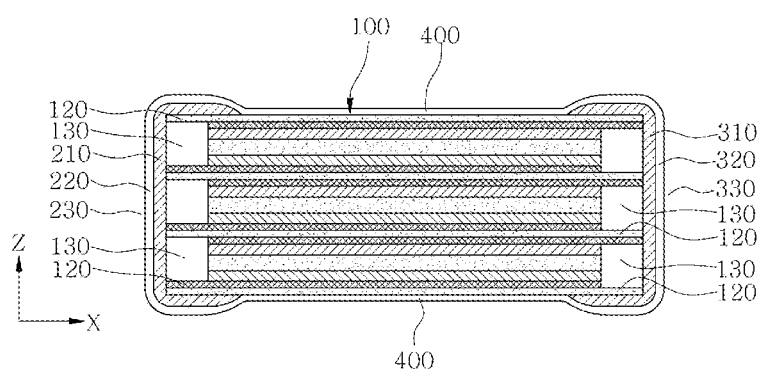
FIG. 8 is a cross-sectional view showing that an outer insulating coating layer is formed on the battery body of FIG. 7.

After the battery body 100 is formed, as shown in FIGS. 1 and 8, a pair of conductive terminal layers 210 and 310 are formed to partly cover one side and the other side of the battery body 100, respectively, in step S113. The pair of conductive terminal layers 210 and 310 are provided to partly cover one side and the other side of the battery body 100 at the end section of the one side or the other side of the battery body, respectively. One of the pair of conductive terminal layers 210 and 310 is connected to the end of one side of the first current collector 111, and the other is connected to the end of the other side of the second current collector 112. The pair of conductive terminal layers 210 and 310 are independently formed of at least one of aluminum (Al), copper (Cu), nickel (Ni), platinum (Pt), palladium (Pd), silver (Ag), black carbon, carbon nano fiber (CNT), and carbon nano tube (CNT), which may be used alone or in combination with each other.

After the pair of conductive terminal layers 210 and 310 are formed, as shown in FIGS. 1 and 8, an outer insulating coating layer 400 is formed to cover the surface of the battery body 100 and the surface of each of the conductive terminal layers 210 and 310, in step S120.

As shown in FIG. 2, a first embodiment of the outer insulating coating layer 400 is formed to cover an exposed surface of the battery body 100 with the pair of conductive terminal layers 210 and 310 formed thereon, and an exposed surface of each of the conductive terminal layers 210 and 310. The outer insulating coating layer 400 is formed using any one selected from a silane-based insulating coating layer 410, an oxide-based insulating coating layer 420, and a glass insulating coating layer 430 to a thickness $T_n$ of 6 to 30 μm by any one method of dipping, spraying, and vacuum impregnation. In other words, the first embodiment of the outer insulating coating layer 400 is any one of silane-based insulating coating layer 410, oxide-based insulating coating layer 420 and glass insulating coating layer 430 that is formed on the whole exposed surface of the battery body 100 with the pair of conductive terminal layers 210 and 310 formed thereon, where the whole exposed surface includes an exposed surface of the battery body 100 and an exposed surface of each of the conductive terminal layers 210 and 310.

The material of the silane-based insulating coating layer 410 for forming the outer insulating coating layer 400 is a silane-based coating agent. The silane-based coating agent is composed of 40 to 70 wt. % of a silane composite, 20 to 40 wt. % of isopropanol group and 10 to 20 wt. % of acetyl alcohol, where the silane composite is composed of 30 to 60 wt. % of aminopropyltriethoxysilane and 40 to 70 wt. % of glycidoxypropyltriepoxysilane.

The material of the oxide-based insulating coating layer 420 is composed of 49 to 89.9 wt. % of an oxide-based ceramic, 10 to 50 wt. % of a silane-based coating agent, and 0.1 to 1 wt. % of a metal salt. Here, the oxide-based ceramic is any one of $SiO_2$, $Al_2O_3$, and $ZrO_2$. The silane-based coating agent is the same as the silane-based coating agent used for the material of the silane-based insulating coating layer 410. The metal salt is an inorganic salt or an organic salt, where the inorganic salt is at least one of $Cl^-$, $Br^-$, $AlCl_4^-$, and $BF_4^-$; and the organic salt is sodium acetate or sodium alginate.

The material of the glass insulating coating layer 430 is a low temperature liquid glass, which is composed of 55 to 59 wt. % of $SiO_2$, 23 to 25 wt. % of CaO, 12 to 13 wt. % of $Al_2O_3$, and 4 to 7 wt. % of MgO.

Figure 3:
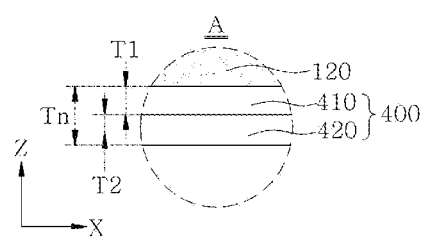
FIG. 3 is an enlarged view showing another embodiment of part 'A' shown in FIG. 2.

As shown in FIG. 3, a second embodiment of the outer insulating coating layer 400 consists of two layers selected from a silane-based insulating coating layer 410, an oxide-based insulating coating layer 420 and a glass insulating coating layer 430. The materials of the silane-based insulating coating layer 410, the oxide-based insulating coating layer 420 and the glass insulating coating layer 430 are the same as those of the silane-based insulating coating layer 410, the oxide-based insulating coating layer 420 and the glass insulating coating layer 430 according to the first embodiment, respectively. In the second embodiment of the outer insulating coating layer 400, when one of the two selected insulating coating layers is the silane-based insulating coating layer 410, the silane-based insulating coating layer 410 is formed to a thickness $T_1$ of 1 to 2 μm; when one of the two selected insulating coating layers is the oxide-based insulating coating layer 420, the oxide-based insulating coating layer 420 is formed to a thickness $T_2$ of 2 to 10 μm; and when one of the two selected insulating coating layers is the glass insulating coating layer 430, the glass insulating coating layer 430 is formed to a thickness $T_3$ of 3 to 18 μm. In the case that the outer insulating coating layer 400 consists of two layers selected from the silane-based insulating coating layer 410, the oxide-based insulating coating layer 420 and the glass insulating coating layer 430, the two selected layers may be formed in a different order. For example, in the outer insulating coating layer 400 consisting of the silane-based insulating coating layer 410 and the oxide-based insulating coating layer 420, the layers may be formed in the order of the silane-based insulating coating layer 410 and the oxide-based insulating coating layer 420, or in the order of the oxide-based insulating coating layer 420 and the silane-based insulating coating layer 410.

In the outer insulating coating layer 400 consisting of two layers selected from the silane-based insulating coating layer 410, the oxide-based insulating coating layer 420 and the glass insulating coating layer 430, each of the two selected layers may be formed to a thickness in such a range that the outer insulating coating layer 400 has a thickness $T_n$ of 6 to 30 μm. In other words, the silane-based insulating coating layer 410 is formed to a thickness $T_1$ of 1 to 2 μm; the oxide-based insulating coating layer 420 is formed to a thickness $T_2$ of 2 to 10 μm; and the glass insulating coating layer 430 is formed to a thickness $T_3$ of 3 to 18 μm.

Figure 4:
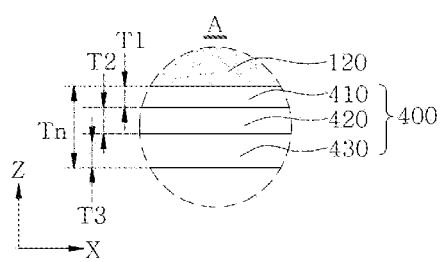
FIG. 4 is an enlarged view showing further another embodiment of part 'A' shown in FIG. 2.

As shown in FIG. 4, a third embodiment of the outer insulating coating layer 400 consists of a silane-based insulating coating layer 410, an oxide-based insulating coating layer 420 and a glass insulating coating layer 430, which are sequentially disposed. The third embodiment of the outer insulating coating layer 400 includes all the three layers of the silane-based insulating coating layer 410, the oxide-based insulating coating layer 420 and the glass insulating coating layer 430. The materials of the silane-based insulating coating layer 410, the oxide-based insulating coating layer 420 and the glass insulating coating layer 430 are the same as those of the silane-based insulating coating layer 410, the oxide-based insulating coating layer 420 and the glass insulating coating layer 430 according to the first embodiment, respectively.

In a fourth embodiment of the outer insulating coating layer 400 that consists of the three layers of a silane-based insulating coating layer 410, an oxide-based insulating coating layer 420 and a glass insulating coating layer 430, the three layers may be formed in a different order. For example, the three layers of the outer insulating coating layer 400 may be formed in the order of the silane-based insulating coating layer 410, the oxide-based insulating coating layer 420 and the glass insulating coating layer 430, as shown in FIG. 4; or in the order of the glass insulating coating layer 430, the oxide-based insulating coating layer 420 and the silane-based insulating coating layer 410; or in the order of the oxide-based insulating coating layer 420, the silane-based insulating coating layer 410 and the glass insulating coating layer 430.

In the outer insulating coating layer 400 consisting of the three layers of the silane-based insulating coating layer 410, the oxide-based insulating coating layer 420 and the glass insulating coating layer 430, each of the three layers may be formed to a thickness so that the thickness $T_n$ of the outer insulating coating layer 400 is in the range of 6 to 30 μm. In other words, the silane-based insulating coating layer 410 is formed to a thickness $T_1$ of 1 to 2 μm; the oxide-based insulating coating layer 420 is formed to a thickness $T_2$ of 2 to 10 μm; and the glass insulating coating layer 430 is formed to a thickness $T_3$ of 3 to 18 μm.

Figure 9:
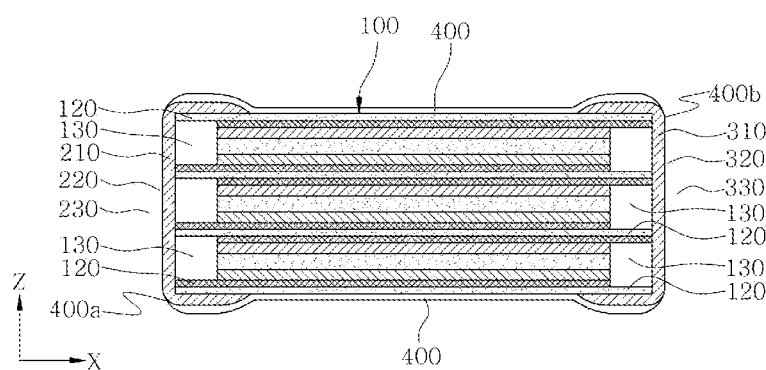
FIG. 9 is a cross-sectional view showing that the outer insulating coating layer on the battery body shown in FIG. 8 is barrel-polished.

After the outer insulating coating layer 400 is formed, as shown in FIGS. 1 and 9, it is polished so that the surfaces of the conductive terminal layers 210 and 310 at the ends of the one side and the other side of the battery body 100 are exposed to form a pair of insulating coating windows 400a and 400b, in step S130. The pair of insulating coating windows 400a and 400b are formed by barrel-polishing the outer insulating coating layer 400 to expose the conductive terminal layers 210 and 310 at the end sections of the one side and the other side of the battery body 100, respectively. In other words, as shown in FIGS. 2 and 9, the pair of insulating coating windows 400a and 400b are the parts of the outer insulating coating layer 400 removed by barrel polishing to expose the conductive terminal layers 210 and 310 at the ends of the one side and the other side of the battery body 100 along the lengthwise direction X, respectively.

After the pair of insulating coating windows 400a and 400b are formed, a pair of inner plating layers 220 and 320 are formed to connect to the surfaces of the conductive terminal layers 210 and 310 exposed through the insulating coating windows 400a and 400b and partly cover one side and the other side of the outer insulating coating layer 400, respectively, in step S140. The pair of inner plating layers 220 and 320 are fabricated by an electroplating method, and their material is nickel (Ni). One 220 out of the pair of inner plating layers 220 and 320 is formed to connect to the surface of one 210 of the pair of conductive terminal layers 210 and 310 exposed through the insulating coating window 400a and partly cover one side of the outer insulating coating layer 400. The other one 320 out of the pair of inner plating layers 220 and 320 is formed to connect to the surface of the other one 310 of the pair of conductive terminal layers 210 and 310 exposed through the insulating coating window 400b and partly cover the other side of the outer insulating coating layer 400. In other words, the pair of inner plating layers 220 and 320 between which the outer insulating coating layer 400 is interposed are formed to overlap the pair of conductive terminal layers 210 and 310 on the one side and the other side of the battery body 100, where the pair of conductive terminal layers 210 and 310 are formed to partly cover the one side and the other side of the battery body 100.

After the pair of inner plating layers 220 and 320 are formed, a pair of outer plating layers 230 and 330 are formed to cover the inner plating layers 230 and 330, respectively, in step S150. The pair of outer plating layers 230 and 330 are fabricated by an electroplating method, and their material is tin (Sn). One of the pair of outer plating layers 230 and 330 is formed to cover one of the pair of inner plating layers 220 and 320, whereas the other one of the pair of outer plating layers 230 and 330 is formed to cover the other one of the pair of inner plating layers 220 and 320. The pair of outer plating layers 230 and 330 between which the outer insulating coating layer 400 is interposed are formed to cover the one side and the other side of the battery body 100 so as to overlap the conductive terminal layers 210 and 310 and the inner plating layers 220 and 320, which overlap each other, on the one side and the other side of the battery body 100, thereby covering the one side and the other side of the battery body 100 to form a pair of external electrodes 200 and 300, respectively. In other words, the pair of outer plating layers 230 and 330 are formed to cover the one side and the other side of the battery body 100, which allows surface mount technology (SMT) applicable to the multilayer ceramic battery (MLCB) of the present invention.

The MLCB of the present invention was prepared by the above-described manufacturing method for MLCB according to the present invention. MLCBs according to the comparative example and examples were fabricated for testing the MLCBs prepared by the manufacturing method for MLCB according to the present invention. An all-solid-state battery body 100 equipped with external electrodes 200 and 300 formed thereon is referred to as a multi-layer ceramic battery (MLCB), where the term "multi-layer" means laminating a plurality of unit battery cells 110; the term "ceramic" refers to as using a ceramic material such as $Al_2O_3$ or ZrO for the unit cell insulating layer 120 interposed between the unit battery cells 110 to insulate the unit battery cells 110; and the term "battery" indicates an electric battery. The MLCB of the present invention is used for surface mount components, such as multi-layer ceramic capacitors (MLCCs), in appearance.

Both the MLCBs according to examples of the present invention and the MLCB according to a comparative example used the battery body 100 in the same manner, but the difference between them lied in the presence or absence of the inner insulating member 130. That is, the battery body 100 of each MLCB according to the examples of the present invention had the inner insulating member 130, whereas the battery body 100 of the MLCB according to the comparative example of the present invention did not have the inner insulating member 130. The inner insulating member 130 was formed of $Al_2O_3$ as a paste to fill the space occurred in the battery body 100 using a printing method.

In the MLCB according to the comparative example, a pair of conductive terminal layers 210 and 310, a pair of inner plating layers 220 and 320, and a pair of outer plating layers 230 and 330 were sequentially formed to complete a pair of external electrodes 200 and 300. The pair of conductive terminal layers 210 and 310 were formed of copper (Cu) and fabricated by a dipping method. The pair of inner plating layers 220 and 320 were formed of nickel (Ni) using an electroplating method. The pair of outer plating layers 230 and 330 were formed of tin (Sn) using an electroplating method. The thickness and the detailed manufacturing process of each layer are the same as known techniques, so the description concerning the thickness and the detailed process is not given in this disclosure. After the pair of external electrodes 200 and 300 were formed, an insulating sheet was applied to the MLCB other than the pair of external electrodes 200 and 300, thereby completing the MLCB according to the comparative example.

In each MLCB according to the examples of the present invention, a pair of conductive terminal layers 210 and 310, a pair of inner plating layers 220 and 320, and a pair of outer plating layers 230 and 330 were sequentially formed to complete a pair of external electrodes 200 and 300 in the same manner of the MLCB according to the comparative example. The MLCBs according to the examples of the present invention differed from the MLCB according to the comparative example in that they were manufactured by sequentially forming the pair of conductive terminal layers 210 and 310, the outer insulating coating layer 400 and the pair of inner plating layers 220 and 320 and then polishing the outer insulating coating layer 400 to form a pair of insulating coating windows 400a and 400b, where the pair of insulating coating widows 400a and 400b were formed to have the pair of inner plating layers 220 and 320 connected to the pair of conductive terminal layers 210 and 310, respectively. In other words, the difference between the MLCBs according to the examples of the present invention and the MLCB according to the comparative example was whether or not the insulating coating windows 400a and 400b were formed prior to the pair of inner plating layers 220 and 320 and the pair of outer plating layers 230 and 330. Therefore, the MLCBs according to the examples of the present invention and the MLCB according to the comparative example were tested as a function of the manufacturing conditions of the insulating coating windows 400a and 400b.

The MLCB according to the comparative example was manufactured as described above, and the MLCBs according to the examples of the present invention were manufactured as given in Table 1.

By using a dipping method, the single layer of a silane-based insulating coating layer 410, an oxide-based insulating coating layer 420, or a glass insulating coating layer 430 was formed as an outer insulating coating layer 400 of Example 1, 2 or 3, respectively. Referring to Table 1, the silane-based insulating coating layer 410, the oxide-based insulating coating layer 420, and the glass insulating coating layer 430 are denoted by SL, OL and GL, respectively.

As for the outer insulating coating layer 400 of the MLCB according to Example 1, the silane-based insulating coating layer 410 was formed to a thickness $T_1$ of 2 μm by applying a silane-based coating agent using a dipping method to have an SL structure as given in Table 1. The material of the silane-based coating agent was a mixture composed of 40 wt. % of a silane composite, 40 wt. % of isopropanol group, and 20 wt. % of acetyl alcohol.

For the outer insulating coating layer 400 of the MLCB according to Example 2, the oxide-based insulating coating layer 420 was formed to a thickness $T_1$ of 10 μm by using a dipping method to have an OL structure as given in Table 1. The material of the oxide-based coating layer 420 was a mixture composed of 49 wt. % of an oxide-based ceramic, 50 wt. % of a silane-based coating agent, and 1 wt. % of a metal salt. The oxide-based ceramic was $SiO_2$, the silane-based coating agent was the same silane-based coating agent of Example 1, and the metal salt was $Cl^-$.

For the outer insulating coating layer 400 of the MLCB according to Example 3, the glass insulating coating layer 430 was formed to a thickness $T_1$ of 18 μm by using a dipping method to have a GL structure as given in Table 1. The material of the glass coating layer 430 was a low temperature liquid glass, which was a mixture composed of 55 wt. % of $SiO_2$, 25 wt. % of CaO, 13 wt. % of $Al_2O_3$, and 7 wt. % of MgO.

For the outer insulating coating layer 400 of the MLCB according to Example 4, the silane-based insulating coating layer 410 and the oxide-based insulating coating layer 420 were sequentially formed to have an SL/OL structure as given in Table 1. The silane-based insulating coating layer 410 was formed to a thickness $T_1$ of 2 μm by a dipping method. The material of the silane-based insulating coating layer 410 was a mixture composed of 70 wt. % of a silane composite, 20 wt. % of isopropanol group, and 10 wt. % of acetyl alcohol. The silane composite was a mixture composed of 60 wt. % of aminopropyltriethoxysilane and 40 wt. % of glycidoxypropyltriepoxysilane. The oxide-based insulating coating layer 420 was formed to a thickness $T_2$ of 10 μm by a dipping method. The material of the oxide-based coating layer 420 was a mixture composed of 89.9 wt. % of an oxide-based ceramic, 10 wt. % of a silane-based coating agent, and 0.1 wt. % of a metal salt. The oxide-based ceramic was $Al_2O_3$, the silane-based coating agent was the same silane-based coating agent of Example 1, and the metal salt was $BF_4^-$.

For the outer insulating coating layer 400 of the MLCB according to Example 5, the silane-based insulating coating layer 410 and the glass insulating coating layer 430 were sequentially formed to have an SL/GL structure as given in Table 1. The silane-based insulating coating layer 410 was formed to a thickness $T_1$ of 2 μm by a dipping method. The material of the silane-based insulating coating layer 410 was a mixture composed of 70 wt. % of a silane composite, 20 wt. % of isopropanol group, and 10 wt. % of acetyl alcohol. The silane composite was a mixture composed of 60 wt. % of aminopropyltriethoxysilane and 40 wt. % of glycidoxypropyltriepoxysilane. The glass insulating coating layer 430 was formed to a thickness $T_2$ of 18 μm by a dipping method. The material of the glass coating layer 430 was a low temperature liquid glass, which was a mixture composed of 59 wt. % of $SiO_2$, 23 wt. % of CaO, 12 wt. % of $Al_2O_3$, and 4 wt. % of MgO.

For the outer insulating coating layer 400 of the MLCB according to Example 6, the oxide-based insulating coating layer 420 and the glass insulating coating layer 430 were sequentially formed to have an OL/GL structure as given in Table 1. The oxide-based insulating coating layer 420 was formed to a thickness $T_1$ of 2 to 10 μm by a dipping method. The material of the oxide-based coating layer 420 was a mixture composed of 89.9 wt. % of an oxide-based ceramic, 10 wt. % of a silane-based coating agent, and 0.1 wt. % of a metal salt. The oxide-based ceramic was $Al_2O_3$, the silane-based coating agent was the same silane-based coating agent of Example 1, and the metal salt was sodium acetate. The glass insulating coating layer 430 was formed to a thickness $T_2$ of 18 μm by a dipping method. The material of the glass coating layer 430 was a low temperature liquid glass, which was a mixture composed of 59 wt. % of $SiO_2$, 23 wt. % of CaO, 12 wt. % of $Al_2O_3$, and 4 wt. % of MgO.

For the outer insulating coating layer 400 of the MLCB according to Example 7, the silane-based insulating coating layer 410, the oxide-based insulating coating layer 420 and the glass insulating coating layer 430 were sequentially formed to have an SL/OL/GL structure as given in Table 1. The silane-based insulating coating layer 410 was formed to a thickness $T_1$ of 1 μm by a dipping method. The material of the silane-based insulating coating layer 410 was a mixture composed of 70 wt. % of a silane composite, 20 wt. % of isopropanol group, and 10 wt. % of acetyl alcohol. The silane composite was a mixture composed of 60 wt. % of aminopropyltriethoxysilane and 40 wt. % of glycidoxypropyltriepoxysilane. The oxide-based insulating coating layer 420 was formed to a thickness $T_2$ of 10 μm by a dipping method. The material of the oxide-based coating layer 420 was a mixture composed of 89.9 wt. % of an oxide-based ceramic, 10 wt. % of a silane-based coating agent, and 0.1 wt. % of a metal salt. The oxide-based ceramic was $ZrO_2$, the silane-based coating agent was the same silane-based coating agent of Example 1, and the metal salt was $BF_4^-$. The glass insulating coating layer 430 was formed to a thickness $T_3$ of 18 μm by a dipping method. The material of the glass coating layer 430 was a low temperature liquid glass, which was a mixture composed of 59 wt. % of $SiO_2$, 23 wt. % of CaO, 12 wt. % of $Al_2O_3$, and 4 wt. % of MgO.

For the outer insulating coating layer 400 of the MLCB according to Example 8, the glass insulating coating layer 430, the oxide-based insulating coating layer 420 and the silane-based insulating coating layer 410 were sequentially formed to have a GL/OL/SL structure as given in Table 1. The glass insulating coating layer 430 was formed to a thickness $T_1$ of 3 μm by a dipping method. The material of the glass coating layer 430 was a low temperature liquid glass, which was a mixture composed of 59 wt. % of $SiO_2$, 23 wt. % of CaO, 12 wt. % of $Al_2O_3$, and 4 wt. % of MgO. The oxide-based insulating coating layer 420 was formed to a thickness $T_2$ of 10 μm by a dipping method. The material of the oxide-based coating layer 420 was a mixture composed of 89.9 wt. % of an oxide-based ceramic, 10 wt. % of a silane-based coating agent, and 0.1 wt. % of a metal salt. The oxide-based ceramic was $ZrO_2$, the silane-based coating agent was the same silane-based coating agent of Example 1, and the metal salt was $BF_4^-$. The silane-based insulating coating layer 410 was formed to a thickness $T_3$ of 2 μm by a dipping method. The material of the silane-based insulating coating layer 410 was a mixture composed of 70 wt. % of a silane composite, 20 wt. % of isopropanol group, and 10 wt. % of acetyl alcohol. The silane composite was a mixture composed of 60 wt. % of aminopropyltriethoxysilane and 40 wt. % of glycidoxypropyltriepoxysilane.

For the outer insulating coating layer 400 of the MLCB according to Example 9, the oxide-based insulating coating layer 420, the glass insulating coating layer 430 and the silane-based insulating coating layer 410 were sequentially formed to have an OL/GL/SL structure as given in Table 1. The oxide-based insulating coating layer 420 was formed to a thickness $T_1$ of 2 μm by a dipping method. The material of the oxide-based coating layer 420 was a mixture composed of 89.9 wt. % of an oxide-based ceramic, 10 wt. % of a silane-based coating agent, and 0.1 wt. % of a metal salt. The oxide-based ceramic was $ZrO_2$, the silane-based coating agent was the same silane-based coating agent of Example 1, and the metal salt was $BF_4^-$. The glass insulating coating layer 430 was formed to a thickness $T_2$ of 10 μm by a dipping method. The material of the glass coating layer 430 was a low temperature liquid glass, which was a mixture composed of 59 wt. % of $SiO_2$, 23 wt. % of CaO, 12 wt. % of $Al_2O_3$, and 4 wt. % of MgO. The silane-based insulating coating layer 410 was formed to a thickness $T_3$ of 2 μm by a dipping method. The material of the silane-based insulating coating layer 410 was a mixture composed of 70 wt. % of a silane composite, 20 wt. % of isopropanol group, and 10 wt. % of acetyl alcohol. The silane composite was a mixture composed of 60 wt. % of aminopropyltriethoxysilane and 40 wt. % of glycidoxypropyltriepoxysilane.

100 of each MLCB according to Comparative Example 1 and Examples 1 to 9 were fabricated and evaluated in terms of moisture resistance, heat & moisture resistance, mechanical properties, and electrical properties. The results are presented in Table 1.

TABLE 1

| Structure of outer insulating coating layer | Moisture resistance | Heat & moisture resistance | Mechanical properties | Electrical properties |
|---|---|---|---|---|
| Comparative Example | — | X | X | X | Δ |
| Example 1 | SL | O | Δ | O | O |
| Example 2 | OL | Δ | Δ | Δ | O |
| Example 3 | GL | O | O | Δ | Δ |
| Example 4 | SL/OL | O | Δ | O | O |
| Example 5 | OL/GL | O | O | Δ | O |
| Example 6 | SL/GL | O | O | O | O |
| Example 7 | SL/OL/GL | * | * | * | O |
| Example 8 | GL/OL/SL | * | * | O | O |
| Example 9 | OL/GL/SL | * | * | * | O |

As shown in Table 1, the Comparative Example had none of the silane-based insulating coating layer 410, the oxide-based insulating coating layer 420 and the glass insulating coating layer 430, and was rated as being poor ("X") in regards to moisture resistance, heat & moisture resistance and mechanical properties and fair("Δ") in electrical properties.

As shown in Table 1, the Example 1 had an "SL" structure, i.e., including the silane-based insulating coating layer 410 and was rated as being good ("O") in regards to moisture resistance and mechanical and electrical properties and fair ("Δ") in heat & moisture resistance.

As shown in Table 1, the Example 2 had an "OL" structure, i.e., including the oxide-based insulating coating layer 420 and was rated as being fair ("Δ") in regards to moisture resistance, heat & moisture resistance and mechanical properties and good ("O") in electrical properties.

As shown in Table 1, the Example 3 had a "GL" structure, i.e., including the glass insulating coating layer 410 and was rated as being good ("O") in regards to moisture resistance and heat & moisture resistance and fair ("Δ") in mechanical and electrical properties. As shown in Table 1, the Example 4 had an "SL/OL" structure, i.e., including the silane-based insulating coating layer 410 and the oxide-based insulating coating layer 420 that were sequentially formed, and was rated as being good ("O") in regards to moisture resistance and mechanical and electrical properties and fair ("Δ") in heat & moisture resistance.

As shown in Table 1, the Example 5 had an "OL/GL" structure, i.e., including the oxide-based insulating coating layer 420 and the glass insulating coating layer 430 that were sequentially formed, and was rated as being good ("O") in regards to moisture resistance, heat & moisture resistance and electrical properties and fair ("Δ") in mechanical properties.

As shown in Table 1, the Example 6 had an "SL/GL" structure, i.e., including the silane-based insulating coating layer 410 and the glass insulating coating layer 430 that were sequentially formed, and was rated as being good ("O") in regards to moisture resistance, heat & moisture resistance and mechanical and electrical properties.

As shown in Table 1, the Example 7 had an "SL/OL/GL" structure, i.e., having the silane-based insulating coating layer 410, the oxide-based insulating coating layer 420 and the glass insulating coating layer 430 that were sequentially formed, and was rated as being excellent("*") in regards to moisture resistance, heat & moisture resistance and mechanical properties and good ("O") in electrical properties.

As shown in Table 1, the Example 8 had a "GL/OL/SL" structure, i.e., having the glass insulating coating layer 430, the oxide-based insulating coating layer 420 and the silane-based insulating coating layer 410 that were sequentially formed, and was rated as being excellent ("*") in regards to moisture resistance and heat & moisture resistance and good ("O") in mechanical and electrical properties.

As shown in Table 1, the Example 9 had an "OL/GL/SL" structure, i.e., including the oxide-based insulating coating layer 420, the glass insulating coating layer 430 and the silane-based insulating coating layer 410 that were sequentially formed, and was rated as being excellent ("*") in regards to moisture resistance, heat & moisture resistance and mechanical properties and good ("O") in electrical properties.

As in the case of Examples 5 and 6 in Table 1, using at least two of the silane-based insulating coating layer 410, the oxide-based insulating coating layer 420 and the glass insulating coating layer 430 and including the glass insulating coating layer 430 as one of the two selected layers resulted in being rated as good ("O") in moisture resistance and heat & moisture resistance. As in the case of Examples 7, 8 and 9 in Table 1, using all of the silane-based insulating coating layer 410, the oxide-based insulating coating layer 420 and the glass insulating coating layer 430 resulted in being rated as excellent ("*") in moisture resistance and heat & moisture resistance irrespective of the order of forming the insulating coating layers. Example 7 using the silane-based insulating coating layer 410, the oxide-based insulating coating layer 420 and the glass insulating coating layer 430 in a sequential order and Example 9 using the oxide-based insulating coating layer 420, the glass insulating coating layer 430 and the silane-based insulating coating layer in a sequential order were both rated as being excellent ("*") in mechanical properties as well.

Each 100 MLCB samples of the Comparative Example 1 and the Examples 1 to 9 were evaluated in regards to moisture resistance, heat & moisture resistance, mechanical properties, and electrical properties. The evaluation results are summarized in Table 1 as follows: 100 acceptable MLCBs, excellent (*); 90 acceptable MLCBs (90%), good (O); 80 acceptable MLCBs (80%), fair (Δ); and less than 80 acceptable MLCBs (~80%), bad (X).

In the evaluation methods of MLCBs in regards to moisture resistance, heat & moisture resistance, mechanical properties, and electrical properties presented in Table 1, the MLCB sample was considered as acceptable for moisture resistance when no moisture penetration occurred after exposure to 85% humidity at 40° C. for 500 hours and for heat &moisture resistance when no moisture penetration occurred after exposure to 85% humidity at 125° C. for 500 hours. As known methods were used in the measurement of moisture resistance and heat & moisture resistance, a description of specific measurement methods is not given in this disclosure.

For mechanical properties, each MLCB sample prepared according to the Comparative Example 1 and Examples 1 to 9 as presented in Table 1 was mounted on a printed circuit board (not shown) and the printed circuit board was bent by force. The MLCB was considered as acceptable when no bending cracks occurred under the force of bending the printed circuit board. As a known method was used in the measurement of mechanical properties, a description of a specific measurement method is not given in this disclosure. For electrical properties, each MLCB sample prepared according to the Comparative Example 1 and Examples 1 to 9 was measured in regards to battery capacity and lifespan, and the measurements were averaged. The MLCB was considered as acceptable when the measured capacity and lifespan were at least 90% of the averages. As a known method was used in the measurement of electrical properties, a description of a specific measurement method is not given in this disclosure.

As described above, the multi-layer ceramic battery (MLCB) and the method for manufacturing the same according to the present invent ion include external electrodes for a battery body that are prepared by sequentially forming conductive terminals for external electrode and an insulating coating layer and then plating the conductive terminals for external electrode, thereby making the conductive terminals for external electrode firmly adhere to the insulating coating layer to enhance moisture resistance and prevent moisture or foreign substances from penetrating into the battery body during the process of plating the conductive terminals for external electrode; secure a firm adhesion between the conductive terminals for external electrode and the insulating coating layer to improve heat & moisture resistance, thereby enhancing the electrical reliability of the product; and use at least one selected from silanes, oxides and glass for the insulating coating layer to further improve moisture resistance.

What is claimed is:

1. A method for manufacturing a multi-layer ceramic battery (MLCB), comprising:
   forming a pair of conductive terminal layers to partly cover one side and the other side of a battery body, respectively;
   forming an outer insulating coating layer to cover the surface of the battery body and each surface of the pair of conductive terminal layers;
   forming a pair of insulating coating windows by polishing the outer insulating coating layer to expose the surfaces of the conductive terminal layers formed at the ends of the one side and the other side of the battery body;
   forming a pair of inner plating layers to connect to the surfaces of the conductive terminal layers exposed through the insulating coating windows and partly cover one side and the other side of the outer insulating coating layer, respectively; and
   forming a pair of outer plating layers to cover the inner plating layers, respectively,
   wherein in the step of forming an outer insulating coating layer to cover the surface of the battery body and each surface of the pair of conductive terminal layers, the outer insulating coating layer is formed by any one method selected from dipping, spraying and vacuum impregnation using any one layer selected from a silane-based insulating coating layer, an oxide-based insulating coating layer and a glass insulating coating layer to a thickness of 6 to 30 μm, wherein the silane-based insulating coating layer is formed of a silane-based coating agent, the silane-based coating agent comprising 40 to 70 wt. % of a silane composite, 20 to 40 wt. % of isopropanol group, and 10 to 20 wt. % of acetyl alcohol, the silane composite comprising 30 to 60 wt. % of aminopropyltriethoxysilane and 40 to 70 wt. % of glycidoxypropyltriepoxysilane, wherein the oxide-based insulating coating layer is formed of a mixture comprising 49 to 89.9 wt. % of an oxide-based ceramic, 10 to 50 wt. % of a silane-based coating agent and 0.1 to 1 wt. % of a metal salt, the oxide-based ceramic being any one of $SiO_2$, $Al_2O_3$ and $ZrO_2$, the silane-based coating agent being the same as the silane-based coating agent used for the material of the silane-based insulating coating layer, the metal salt being an inorganic salt or an organic salt, the inorganic salt being at least one of $Cl^-$, $Br^-$, $AlCl_4^-$ and $BF_4^-$, the organic salt being sodium acetate or sodium alginate, and wherein the glass insulating coating layer is formed of a low temperature liquid glass, the low temperature liquid glass comprising 55 to 59 wt. % of $SiO_2$, 23 to 25 wt. % of CaO, 12 to 13 wt. % of $Al_2O_3$, and 4 to 7 wt. % of MgQ.

2. The method according to claim 1, wherein the step of forming a pair of conductive terminal layers to partly cover one side and the other side of the battery body, respectively, comprises:

separately preparing a plurality of unit battery cells and a plurality of unit cell insulating layers for the battery body;

disposing the unit cell insulating layers on the top or bottom side of the plurality of unit battery cells to form the battery body; and forming a pair of conductive terminal layers to partly cover the one side and the other side of the battery body, respectively, wherein the step of separately preparing a plurality of unit battery cells and a plurality of unit cell insulating layers comprises:

preparing a first current collector and a second current collector for each of the unit battery cells, wherein an anode material layer is formed on the other side of the first current collector, and the end of one side of the first current collector is connected to one of the pair of conductive terminal layers, wherein a cathode material layer is formed on one side of the second current collector, and the end of the other side of the second current collector is connected to the other one of the pair of conductive terminal layers, and disposing a solid-state electrolyte layer between the anode material layer and the cathode material layer to alternately place the second current collector on the top or bottom side of the first current collector, wherein the anode material layer is formed of lithium cobalt oxide (LCO) or lithium manganese oxide (LMO), wherein the cathode material layer is formed of lithium titanium oxide (LTO) or carbon.

3. The method according to claim 2, wherein the step of alternately placing the second current collector on the top or bottom side of the first current collector further comprises forming an inner insulating member positioned on one side or the other side of the anode material layer, the solid-state electrolyte layer, and the cathode material layer so that the inner insulating member is positioned on the top of the other side of the first current collector or on the bottom of the one side of the second current collector when the second current collector is alternately placed on the top or bottom side of the first current collector, wherein the solid-state electrolyte layer is formed of any one of LGPS ($Li_{10}GeP_2S_{12}$), LSPSCl ($Li_{9.54}Si_{1.74}P_{1.44}S_{11.7}Cl_{10.3}$) and LLTO ($Li_{0.5}La_{0.5}TiO_3$), wherein the unit cell insulating layer and the inner insulating member are formed of at least one of $Al_2O_3$, ZrO and glass, which are used alone or in combination.

4. The method according to claim 1, wherein in the step of forming a pair of conductive terminal layers to partly cover one side and the other side of the battery body, respectively, the pair of conductive terminal layers are formed to partly cover the ends of the one side or the other side of the battery body, respectively, wherein one of the pair of conductive terminal layers is connected to the end of the one side of the first current collector, the other one of the pair of conductive terminal layers being connected to the end of the other side of the second current collector, wherein the first and second current collectors are formed of at least one selected from Al, Cu, Ni, Pt, Pd, Ag, black carbon, carbon nano fiber (CNF), and carbon nano tube (CNT), which are used alone or in combination.

5. The method according to claim 1, wherein in the step of forming an outer insulating coating layer to cover the surface of the battery body and each surface of the pair of conductive terminal layers, the outer insulating coating layer is formed to cover an exposed surface of the battery body with the pair of conductive terminal layers formed thereon, and each exposed surface of the pair of conductive terminal layers.

6. The method according to claim 1, wherein in the step of forming a pair of insulating coating windows by polishing the outer insulating coating layer, the pair of insulating coating windows are formed by barrel-polishing the outer insulating coating layer to expose the conductive terminal layers formed at the end sections of the one side and the other side of the battery body, respectively.

7. The method according to claim 1, wherein in the step of forming a pair of inner plating layers formed to connect to the surfaces of the conductive terminal layers exposed through the insulating coating windows and partly cover one side and the other side of the outer insulating coating layer, the pair of inner plating layers are formed by electroplating using nickel (Ni), wherein one of the pair of inner plating layers is formed to connect to the surface of one of the pair of conductive terminal layers exposed through the insulating coating windows and partly cover one side of the outer insulating coating layer, wherein the other one of the pair of inner plating layers is formed to connect to the surface of the other one of the pair of conductive terminal layers exposed through the insulating coating windows and partly cover the other side of the outer insulating coating layer.

8. The method according to claim 1, wherein in the step of forming a pair of outer plating layers to cover the inner plating layers, respectively, the pair of outer plating layers are formed by electroplating using tin (Sn), wherein one of the pair of outer plating layers is formed to cover one of the pair of inner plating layers, the other of the pair of outer plating layers being formed to cover the other one of the pair of inner plating layer.

9. A multi-layer ceramic battery (MLCB) prepared by the method for manufacturing an MLCB according to claim 1.

10. A method for manufacturing a multi-layer ceramic battery (MLCB), comprising:
    forming a pair of conductive terminal layers to partly cover one side and the other side of a battery body, respectively;
    forming an outer insulating coating layer to cover the surface of the battery body and each surface of the pair of conductive terminal layers;
    forming a pair of insulating coating windows by polishing the outer insulating coating layer to expose the surfaces of the conductive terminal layers formed at the ends of the one side and the other side of the battery body;
    forming a pair of inner plating layers to connect to the surfaces of the conductive terminal layers exposed through the insulating coating windows and partly cover one side and the other side of the outer insulating coating layer, respectively; and
    forming a pair of outer plating layers to cover the inner plating layers, respectively,
    wherein in the step of forming an outer insulating coating layer to cover the surface of the battery body and each surface of the pair of conductive terminal layers, the outer insulating coating layer is formed of two layers selected from a silane-based insulating coating layer, an oxide-based insulating coating layer and a glass insulating coating layer,
    wherein the silane-based insulating coating layer, when included as one of the two selected layers, is formed to a thickness of 1 to 2 μm,
    wherein the oxide-based insulating coating layer, when included as one of the two selected layers, is formed to a thickness of 2 to 10 μm,
    wherein the glass insulating coating layer, when included as one of the two selected layers, is formed to a thickness of 3 to 18 μm.

11. A method for manufacturing a multi-layer ceramic battery (MLCB), comprising:
    forming a pair of conductive terminal layers to partly cover one side and the other side of a battery body, respectively;
    forming an outer insulating coating layer to cover the surface of the battery body and each surface of the pair of conductive terminal layers;
    forming a pair of insulating coating windows by polishing the outer insulating coating layer to expose the surfaces of the conductive terminal layers formed at the ends of the one side and the other side of the battery body;
    forming a pair of inner plating layers to connect to the surfaces of the conductive terminal layers exposed through the insulating coating windows and partly cover one side and the other side of the outer insulating coating layer, respectively; and
    forming a pair of outer plating layers to cover the inner plating layers, respectively,
    wherein in the step of forming an outer insulating coating layer to cover the surface of the battery body and each surface of the pair of conductive terminal layers, the outer insulating coating layer is formed by sequentially placing a silane-based insulating coating layer, an oxide-based insulating coating layer and a glass insulating coating layer,
    wherein the silane-based insulating coating layer is formed to a thickness of 1 to 2 μm,
    wherein the oxide-based insulating coating layer is formed to a thickness of 2 to 10 μm,
    wherein the glass insulating coating layer is formed to a thickness of 3 to 18 μm.

* * * * *